United States Patent
Long et al.

(10) Patent No.: US 10,218,163 B2
(45) Date of Patent: Feb. 26, 2019

(54) SUMP JUNCTION BOX

(71) Applicants: Daniel Christopher Long, Raleigh, NC (US); Kevin Allen Webster, Clayton, NC (US); Charles J. Liebal, Jr., Raleigh, NC (US); Daniel Lee Boyle, Garner, NC (US); Wolfgang Emmanuel Sanyer, Raleigh, NC (US); Glenn Michael Eckart, Pasadena, MD (US); Kristopher A. Kane, Fairfield, OH (US)

(72) Inventors: Daniel Christopher Long, Raleigh, NC (US); Kevin Allen Webster, Clayton, NC (US); Charles J. Liebal, Jr., Raleigh, NC (US); Daniel Lee Boyle, Garner, NC (US); Wolfgang Emmanuel Sanyer, Raleigh, NC (US); Glenn Michael Eckart, Pasadena, MD (US); Kristopher A. Kane, Fairfield, OH (US)

(73) Assignee: OPW FUELING COMPONENTS, LLC, Hamilton, OH (US)

( * ) Notice: Subject to any disclaimer, the term of this patent is extended or adjusted under 35 U.S.C. 154(b) by 8 days.

(21) Appl. No.: 15/493,198

(22) Filed: Apr. 21, 2017

(65) Prior Publication Data
US 2017/0324234 A1 Nov. 9, 2017

Related U.S. Application Data

(60) Provisional application No. 62/333,423, filed on May 9, 2016.

(51) Int. Cl.
*H02G 3/08* (2006.01)
*H02G 9/02* (2006.01)
(Continued)

(52) U.S. Cl.
CPC ......... *H02G 9/025* (2013.01); *F04D 13/0693* (2013.01); *F04D 25/0693* (2013.01);
(Continued)

(58) Field of Classification Search
CPC .......... H02G 3/08; H02G 3/081; H02G 3/088; H02G 3/18; H02G 9/025; H02G 9/00;
(Continued)

(56) References Cited

U.S. PATENT DOCUMENTS

| 2,918,016 A | 12/1959 | Olson | |
|---|---|---|---|
| 3,761,601 A | 9/1973 | Kaesser et al. | |
| 4,339,231 A * | 7/1982 | Conery | H02G 3/086 174/560 |
| 5,147,980 A | 9/1992 | Ferguson, Jr. | |
| 5,382,752 A * | 1/1995 | Reyhan | H02G 3/088 174/38 |
| 5,541,363 A * | 7/1996 | Weise | H02G 3/088 174/38 |

(Continued)

OTHER PUBLICATIONS

Photographs (2) of Tank Sump (Jan. 2016).
OPW "REF" Rigid Entry Fitting (Jan. 2016).

*Primary Examiner* — Angel R Estrada
(74) *Attorney, Agent, or Firm* — Thompson Hine LLP

(57) ABSTRACT

A system including a sump having an inner volume and a junction box coupled to the sump. The junction box has a body defining an inner volume, and also has a first inlet and a second inlet, wherein each inlet is in fluid communication with the inner volume of the body. The junction box further has a first outlet and a second outlet, wherein each outlet is in fluid communication with the inner volume of the body such that a first wire is positionable in the first inlet and the first outlet and a second wire is positioned in the second inlet and the second outlet.

25 Claims, 16 Drawing Sheets

(51) Int. Cl.
*F04D 25/06* (2006.01)
*H02G 3/18* (2006.01)
*F04D 29/40* (2006.01)
*F04D 29/60* (2006.01)
*H02G 15/00* (2006.01)
*F04D 13/06* (2006.01)

(52) U.S. Cl.
CPC ......... *F04D 29/406* (2013.01); *F04D 29/606* (2013.01); *H02G 3/088* (2013.01); *H02G 3/18* (2013.01); *H02G 15/003* (2013.01)

(58) Field of Classification Search
CPC ....... H02G 9/02; F04D 25/0693; F04D 25/00; F04D 25/02
USPC ..... 174/50, 520, 535, 47, 480, 481, 37, 559; 220/3.2, 3.3, 4.02; 361/600, 601, 641, 361/679.01, 603, 623
See application file for complete search history.

(56) References Cited

U.S. PATENT DOCUMENTS

| | | | |
|---|---|---|---|
| 5,696,493 A | 12/1997 | Einck | |
| 5,717,564 A | 2/1998 | Lindale | |
| 6,059,208 A * | 5/2000 | Struthers | E03F 5/26 241/285.1 |
| 6,224,752 B1 * | 5/2001 | Drewery | C02F 3/006 439/462 |
| 6,617,973 B1 * | 9/2003 | Osterman | E21F 17/06 361/641 |
| 8,383,935 B1 * | 2/2013 | Wiechman | H02G 3/185 174/50 |
| 8,661,666 B2 | 3/2014 | Grady | |
| 2013/0223037 A1 | 8/2013 | Mikami | |
| 2015/0171543 A1 | 6/2015 | Sittner et al. | |
| 2016/0028182 A1 | 1/2016 | Ledgerwood et al. | |

* cited by examiner

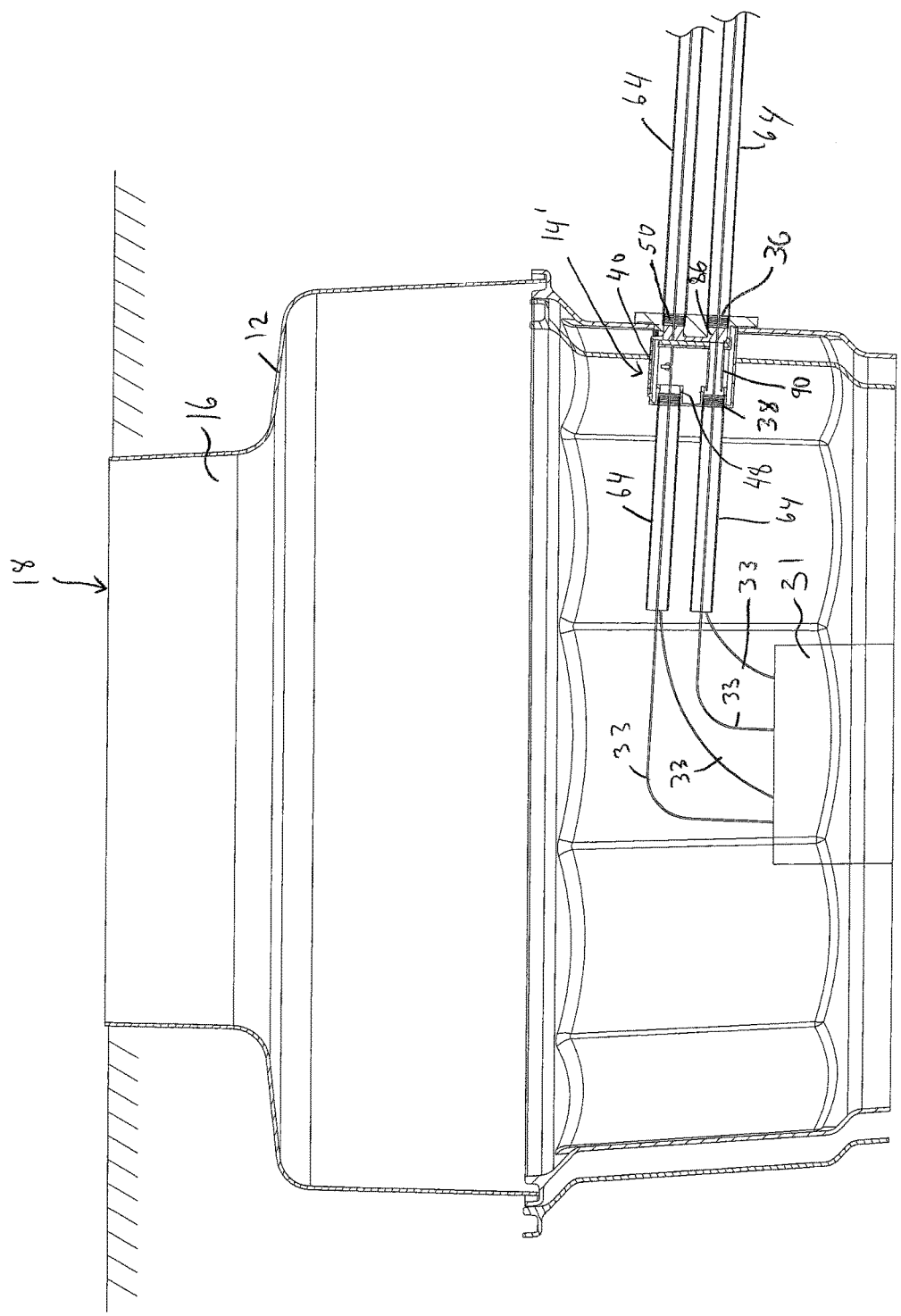

SUMP JUNCTION BOX

This application claims priority to U.S. provisional patent application Ser. No. 62/333,423, filed on May 9, 2016, the entire contents of which are hereby incorporated by reference.

The present invention is directed to a junction box, and more particularly, to a junction box for use with a sump.

BACKGROUND

Sumps and other storage/containment devices are often used for containing pumps or other fluid handling equipment positioned therein, along with various sensors and other transducers. It is often desired to make electrical connections to the components located in the sump. In many existing systems, a conduit penetrates through the wall of the sump, and a wire is passed through each conduit and then individually connected to a pump wire or the like. The wire connections are then positioned inside a conduit fitting, and the conduit fitting is filled with an epoxy or the like. However, these systems and methods for connecting wires and sealing the wire connections are labor intensive, and require conduit fittings that must be separately supplied and secured in place. In addition, in many existing systems the junction box is positioned in a lower portion of the sump, and thus can be positioned below the water table.

SUMMARY

In one embodiment the present invention is a sump junction box which can be integrally connected to the sump and enables multiple electrical wires to extend therethrough into the sump for ease of connection. More particularly, in one embodiment the invention is a system including a sump having an inner volume and a junction box coupled to the sump. The junction box has a body defining an inner volume, and also has a first inlet and a second inlet, wherein each inlet is in fluid communication with the inner volume of the body. The junction box further has a first outlet and a second outlet, wherein each outlet is in fluid communication with the inner volume of the body such that a first wire is positionable in the first inlet and the first outlet and a second wire is positioned in the second inlet and the second outlet.

BRIEF DESCRIPTION OF DRAWINGS

FIG. 21 illustrates the system of FIG. 10, with the junction box fully installed to connect wires to a pump.

DETAILED DESCRIPTION

Figure 1:
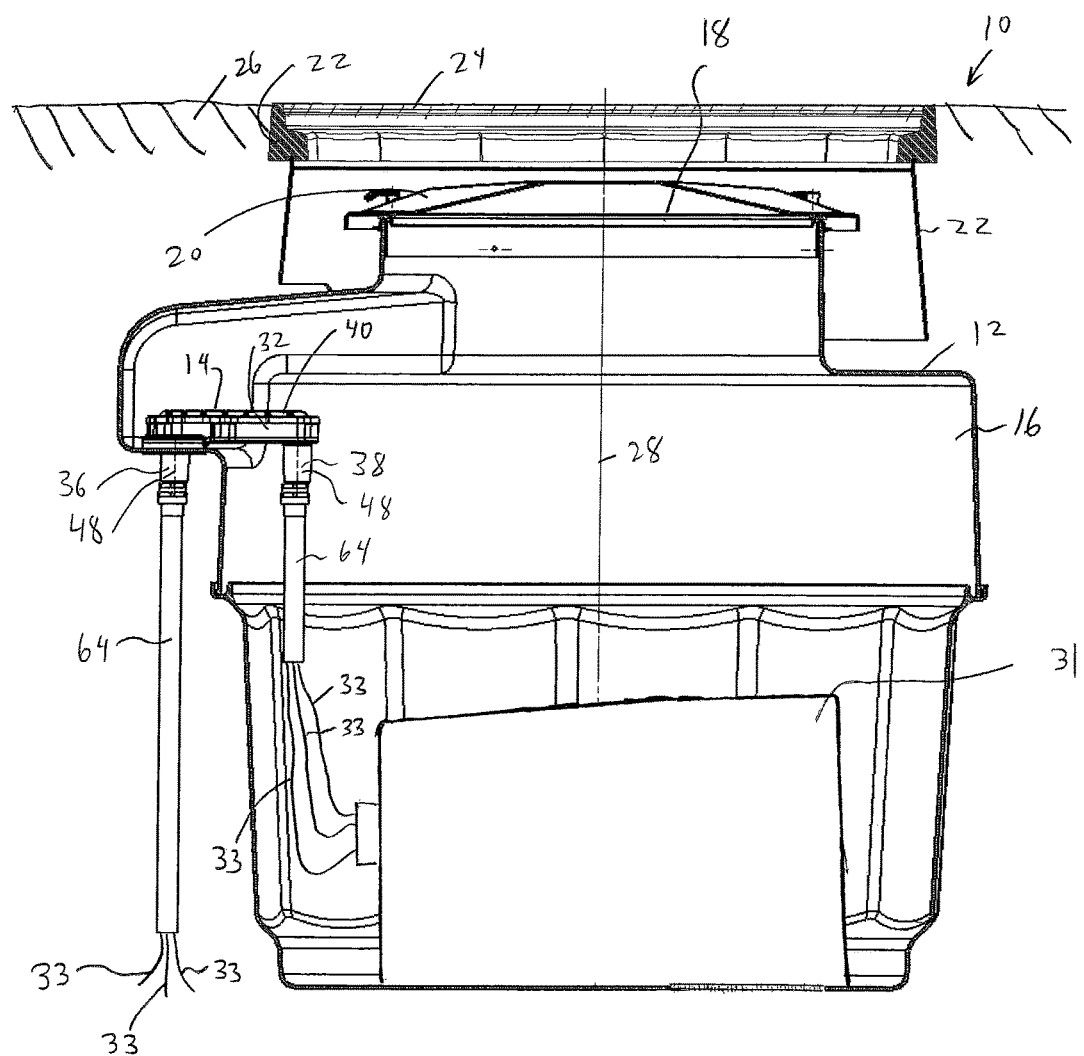
FIG. 1 is a side partial cross section of a sump, with a junction box integrated therein.

FIG. 1 shows a sump system or junction system 10 including a sump, containment chamber 12 or the like, and a sump junction box or container 14 used in conjunction with and/or coupled to the sump 12. The sump 12 may have an inner cavity or inner volume 16 and be generally fluid tight and generally sealed to contain leaks of any fluid therein and to prevent any external fluid from penetrating into the sump 12. The sump 12 can include a top opening 18 that is closeable/coverable with a cover 20 that is removable to provide access to the inner volume 16. A backfill protector 22 with a removable cover 24 can be positioned about an upper end of the sump 12 to retain backfill material 26, soil, ground surface, etc. when the sump 12 is buried underground or the like. The sump 12 can include a central axis 28 (e.g. in one case that extends through or as aligned with a center of the opening 18) that is oriented perpendicular to the opening 18, and configured to be oriented generally vertically when the sump 12 is installed into or under a ground surface 26 as shown in FIG. 1. In one case the sump 12 includes a vertical height dimension, and the junction box 14 is entirely positioned in an upper half of the height dimension of the sump 12, and in another case is positioned in an upper quarter of the height dimension.

A schematically illustrated pump 31 is positioned inside the sump 12. The pump 31 can include or be electrically coupled to a plurality of electrical wires or wire systems 33 to provide power to the pump 31, and/or to control and/or monitor operations of the pump 31, etc. However, it should be understood that any of a variety of devices or fluid handling/processing equipment besides or in addition to a pump 31 can be positioned in the sump 12.

Figure 2:
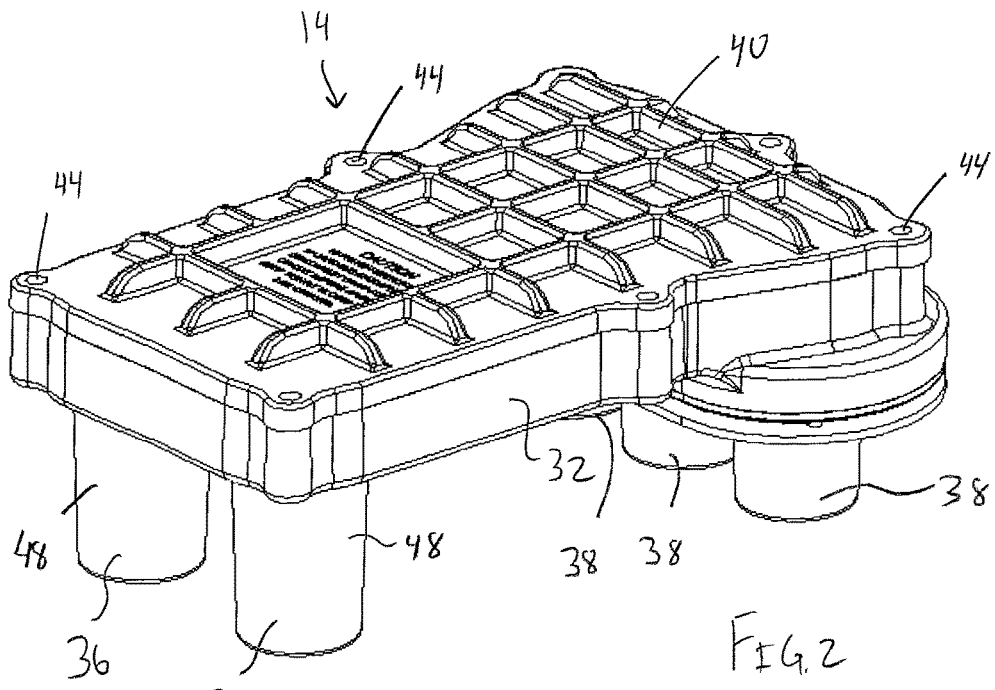
FIG. 2 is an upper perspective view of the junction box of FIG. 1.
Figure 3:
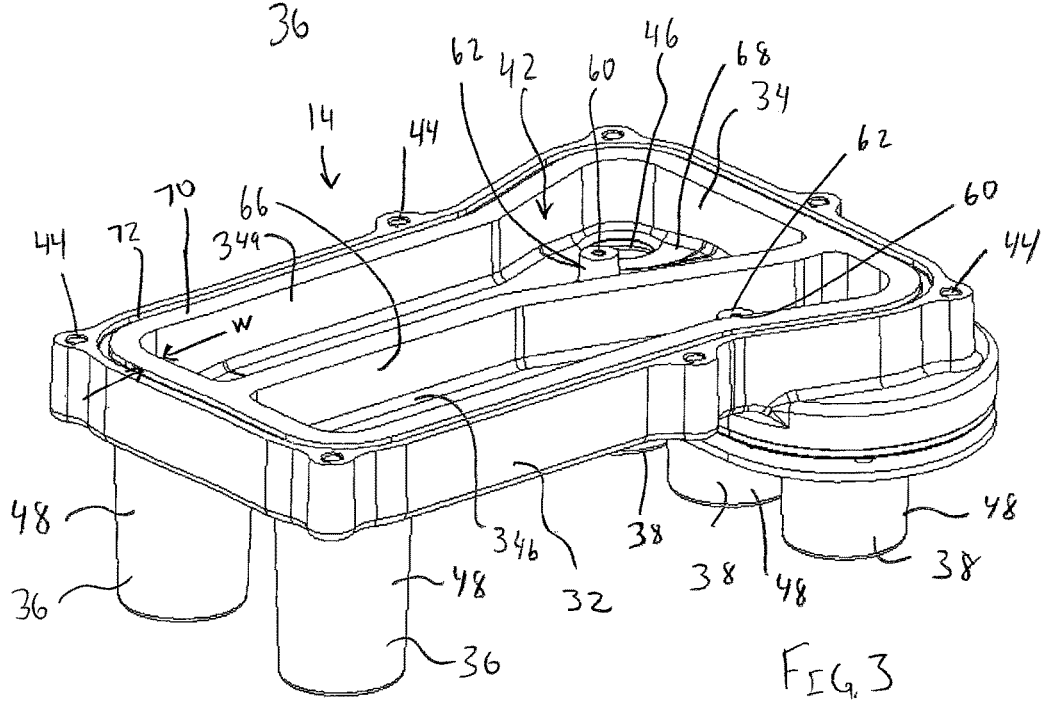
FIG. 3 shows the junction box of FIG. 2; with the cover removed.

With reference to FIGS. 2 and 3, the junction box or container 14 includes a body 32 defining an inner volume or inner cavity 34, and a plurality of inlets 36 and a plurality of outlets 38, each of which provide access to the inner volume 34 and/or are in fluid communication with the inner volume 34. The inner volume 16 of the sump 12 can be significantly greater than the inner volume 34 of the junction box 14 due to the disparate nature of those components—i.e. the junction box 14 is designed to allow wires 33 to pass through and/or to enable connections, whereas the sump 12 is designed to store relatively large mechanical equipment therein. The inner volume 16 of the sump 12 can thus be significantly greater than the inner volume 34 of the junction box 14; in one case the inner volume 16 of the sump 12 is at least about ten times greater, or in another case at least about thirty times greater, than the inner volume 34 of the junction box 14. It may be desired to keep the inner volume 34 of the junction box 14 relatively small to help maximize the inner volume 16 of the sump 12 and/or to make it easier to contain any explosions in the inner volume 34 and to comply with relevant regulations.

With reference to FIG. 2, the junction box 14 can include a cover 40 that is removably sealingly attachable to the junction box 14/body 32 (or removably sealingly attachable to a remainder of the junction box 14/body 32). When in place the cover 40 covers an access opening 42 of the junction box 14/body 32, and when the cover 40 is removed the access opening 42 provides manual access to inner volume 34. In the illustrated embodiment the cover 40 is secured in place by passing fasteners (not shown) through openings 44 in the cover 40 and corresponding aligned openings 44 in the body 32 of the junction box 14, although the cover 40 can be secured in place by any of a variety of means or mechanisms. The junction box 14/body 32 (including the cover 40) can be made of a variety of materials, including metals (such as aluminum, steel, brass, etc.), composite materials etc.

Figure 5:
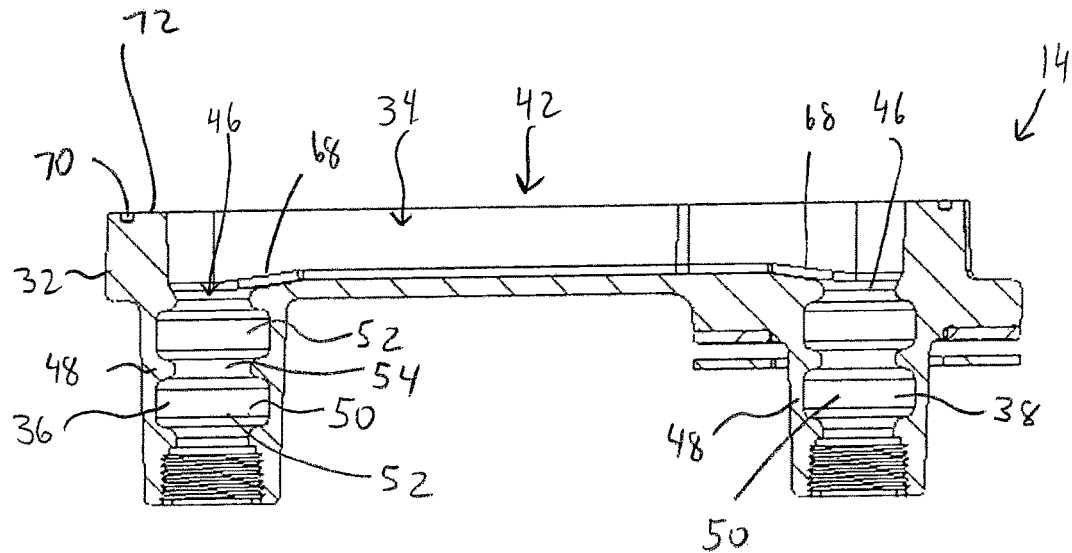
FIG. 5 is a side cross section taken along line 5-5 of FIG. 4.
Figure 6:
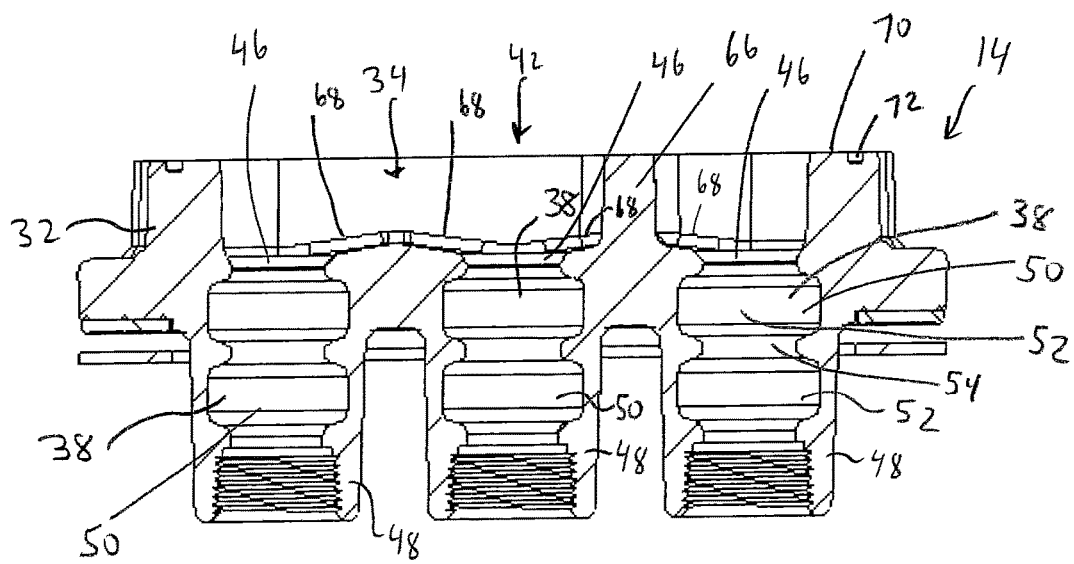
FIG. 6 is a side cross section taken along line 6-6 of FIG. 4.

With reference to FIGS. 5 and 6 each of the inlets 36 and outlets 38 can include or take the form of openings 46 that provide access to the inner cavity 34 of the junction box 14. Each of the inlets 36 and outlets 38 can also include or take the form of cylindrical or tubular bodies 48 that has or defines an inner volume 50. In the illustrated case the inner volume 50 of each inlet 36 and outlet 38 is generally "dumbbell-shaped" in a vertical orientation, with a pair of opposed bulbous ends 52 connected by a center neck or connecting portion 54 of smaller cross sectional area than the ends 52. The inner volume 50 of each inlet 36/outlet 38 can be considered generally separate and discrete from, but in fluid communication with, the inner volume 34 of the junction box 14 and/or the inner volume 16 of the sump 12. The inner volume 50 of each inlet 36/outlet 38 can extend axially a distance greater than a thickness of a wall of the body 32 of the junction box 14 such that an inner volume 50 of each inlet 36/outlet 38 is greater than an inner volume defined by an simple opening through a wall of the body 32.

Figure 4:
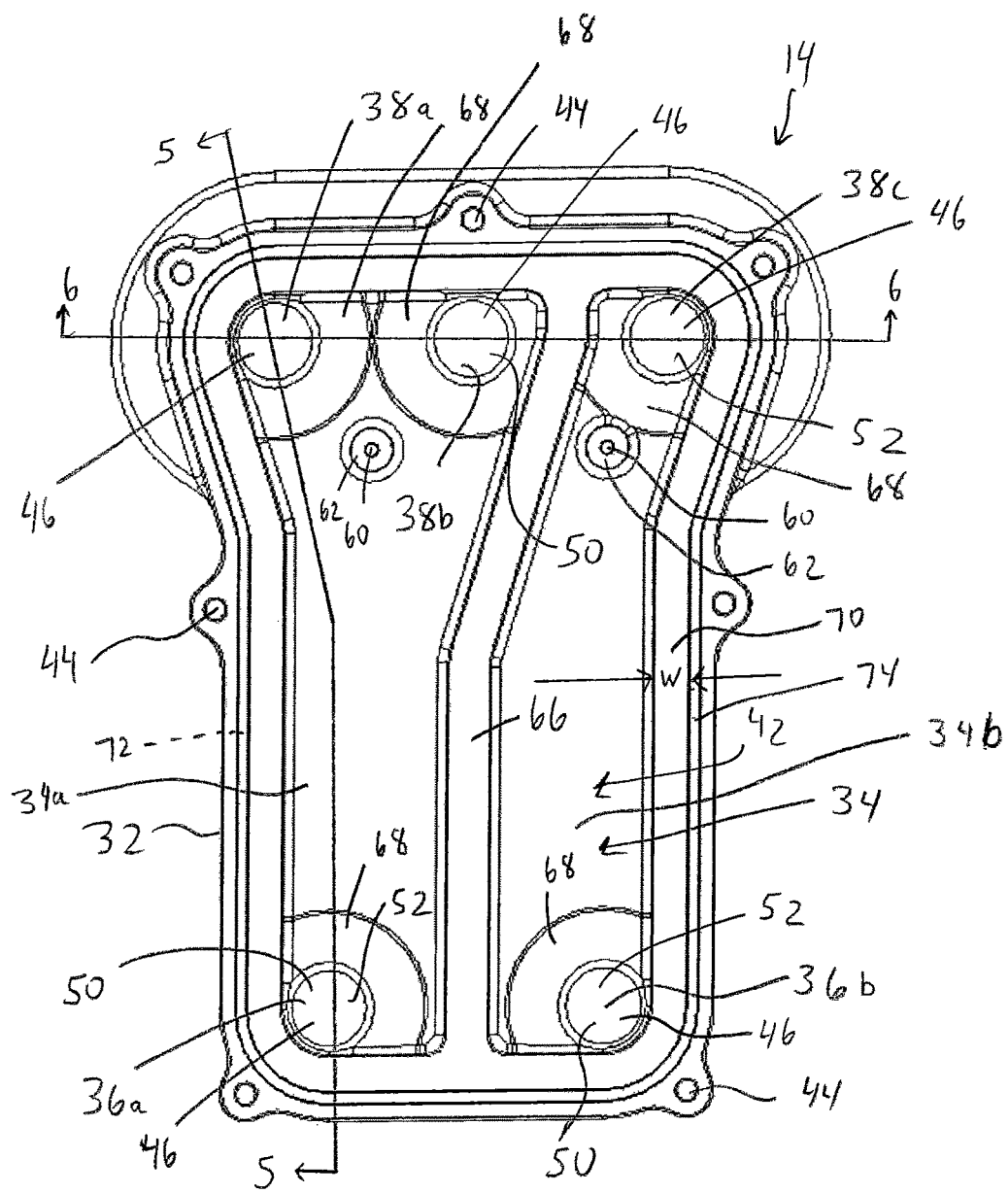
FIG. 4 is a top view of the junction box of FIG. 3.

With reference to FIG. 4, in the illustrated embodiment the junction box 14 includes two inlets 36a, 36b and three outlets 38a, 38b, 38c, although this configuration and arrangement can be varied as desired. It should be noted that the term "inlet" (as compared to an "outlet") can be considered to designate an port or opening through which a wire 33 passes or can pass from a remote source (such as a power source, controller, etc.), directly to the inner volume 34 of the junction box 14 (or vice versa). Conversely the term "outlet" (as compared with the term "inlet") can be considered to designate a port or opening through which a wire 33 passes or can pass from the inner volume 34 of the junction box 14 to the inner volume 16 of the sump 12 (or vice versa). However the term "inlet" and "outlet" can be reversed or adjusted beyond the frame of reference described above.

The junction box 14 can also include a pair of ground connections 60 positioned in a floor of the junction box 14/body 20 in the illustrated embodiment. The ground connections 60 can each take the form a raised boss 62 with a threaded hole therein. Each ground connections 60 enables a ground wire to be positioned therein and/or connected via a fastener or screw (not shown) threaded in the ground connection 60 to act as an electrical ground.

With reference to FIG. 1, the junction box 14 can be permanently, integrally and non-removably coupled to the sump 12 if desired, but fluidly isolated from the sump 12, except through the outlets 38. As shown in FIGS. 5 and 6, each inlet 36 and outlet 38 and the associated body 48 can be internally threaded at its lower end, which enables externally threaded conduit, pipes or the like 64 to be threadably coupled to the junction box 14 (see FIGS. 1, 8 and 9). However, the threaded arrangement can be reversed if desired such that each inlet 36 and outlet 38 is instead externally threaded and each conduit 64 is internally threaded. In addition each conduit 64 can be secured to the junction box 14 by any of a wide variety of couplings, connectors, adhesives etc.

With reference to FIGS. 3, 4 and 6, the junction box 14/body 20 can include a wall 66 positioned in the inner volume 34. The wall 66 can extend continuously from the vertical top to the vertical bottom of junction box 14/inner volume 34 forming two isolated sub volumes 34a, 34b. With reference to FIG. 4, the wall 66 and sub volumes 34a, 34b can be configured to fluidly isolate the inlet 36a and outlets 38a, 38b, on the one hand, from the inlet 36b and the outlet 38c on the other hand, when the cover 40 is installed, for purposes which will be later described.

Each inlet 36 and outlet 38, the associated openings 46 can be formed or positioned in a lower surface of the inner volume 34/junction box 14/body 32. Each inlet 36 and outlet 38, and the associated openings 46, and the associated conduit 64 can each be generally vertically oriented and/or have a central axis oriented generally parallel to the central axis 28 of the sump 12 to provide vertical entry to and exit from the junction box 14. In addition, as best shown in FIGS. 4-6, an upper face of the lower surface of the junction box 14/body 32 can include angled or chamfered surfaces 68 extending at least partially around the perimeter of each opening 46. The angled or chamfered surfaces 68 are configured such that any fluid on the angled or chamfered surface 68 is directed to the associated opening 46 by gravity when the junction box 14 is properly oriented, for purposes which will be described below.

With reference to FIGS. 3 and 4, the base portion of the junction box 14 can include a generally flat flange surface 70 extending around a perimeter of the junction box, where the flange 70 has a width w to provide a sufficient surface area to provide a securing (and explosion-resistant) coupling with the cover 40. The cover 40 can include a generally flat flange surface that has a width corresponding to the width w to provide the secure coupling. In this manner the coupling/junction box 14 may be able to withstand internal pressures and/or a sudden increase in pressure, so that the junction box 14 can sufficiently contain any explosions therein.

Figure 9:
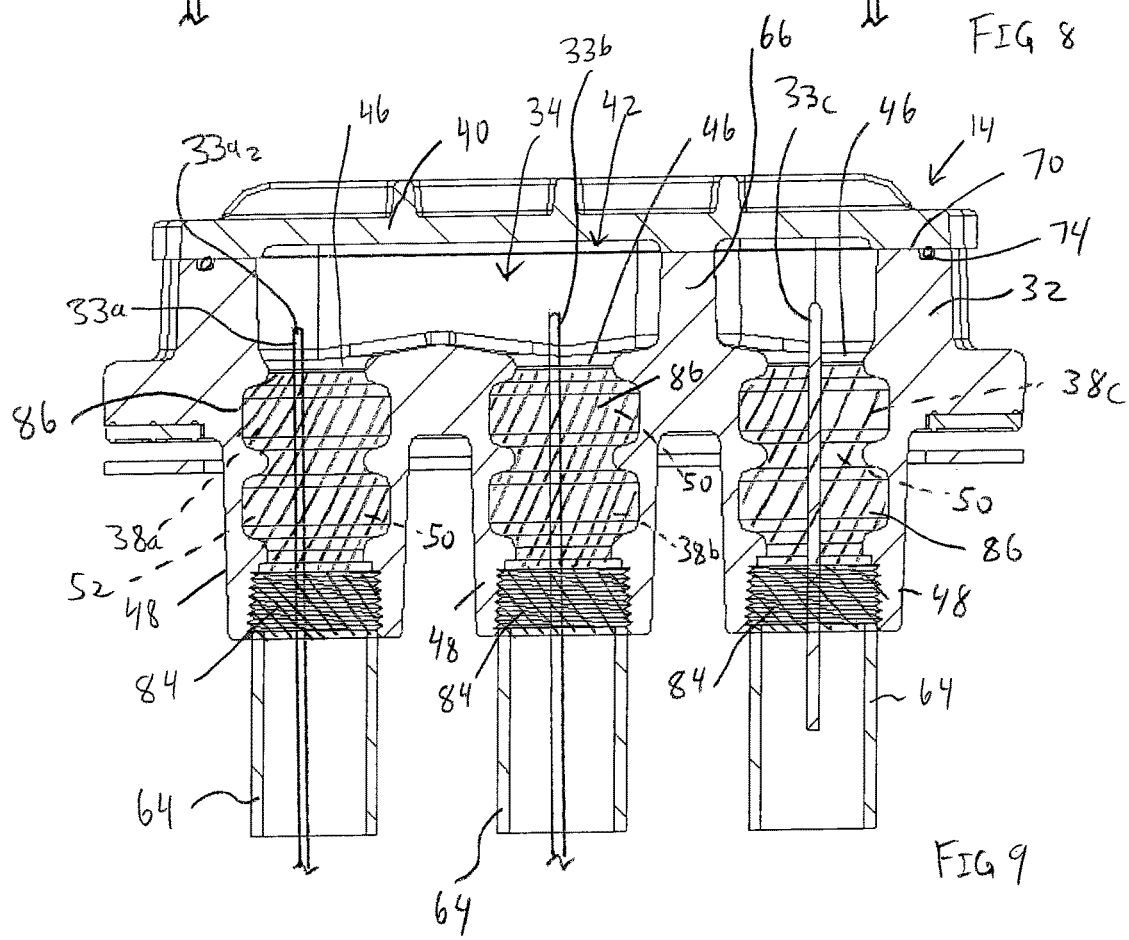
FIG. 9 shows the side cross section of FIG. 6, in conjunction with a wire, conduit and potting compound, and with the cover in place.
Figure 10:
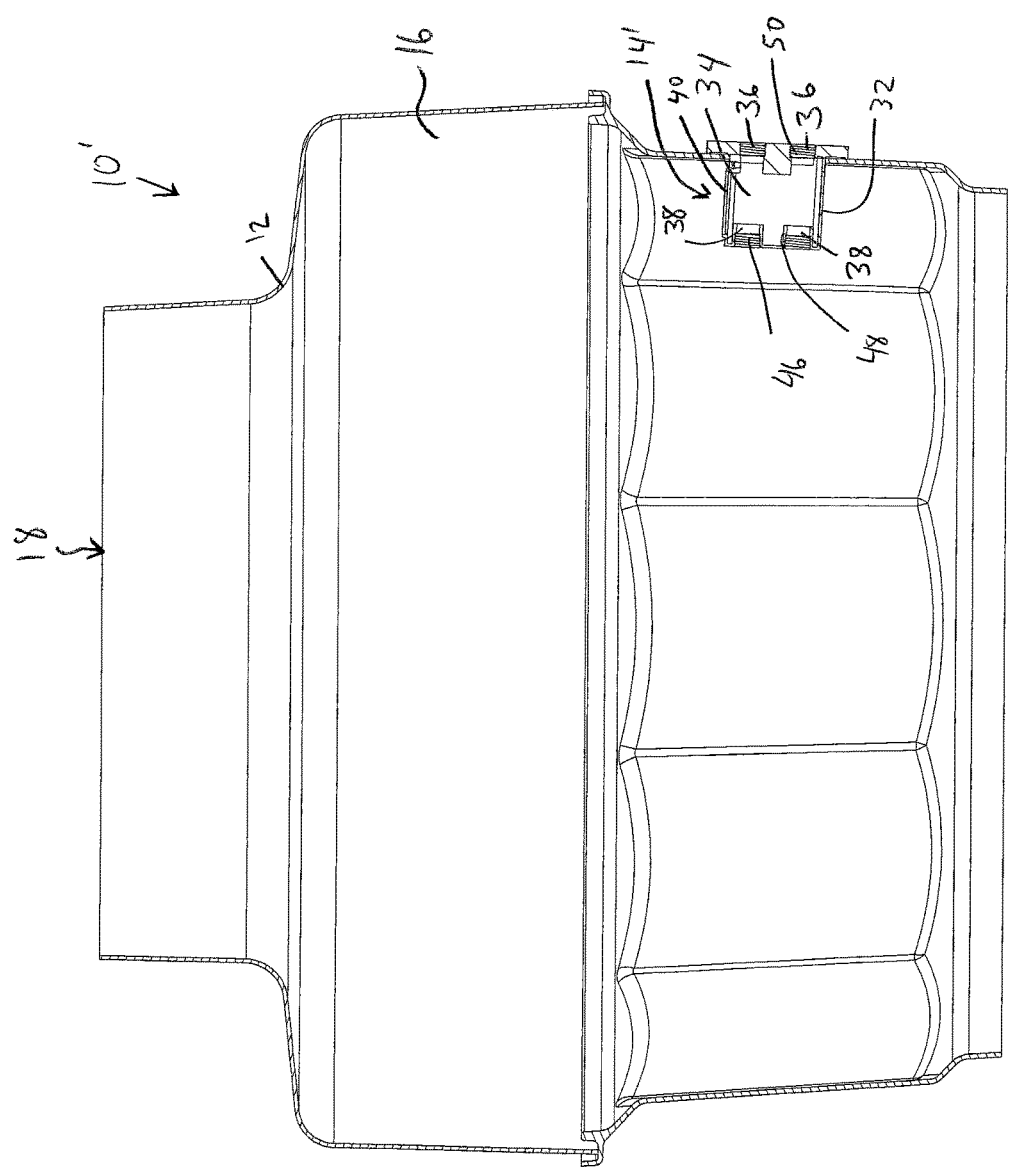
FIG. 10 is a side cross section of a sump, with an alternate junction box integrated therein.

In addition, the junction box 14 can include a groove 72, positioned outside or inside the flange 70, which receives a seal 74 such as an O-ring seal therein (FIGS. 4 and 9). The seal 74 helps to provide a fluid-tight connection with the cover 40 so that the junction box 14, in addition to complying with the appropriate explosion-proof standards, is fluid tight. If desired the position of the groove 72 and seal 74 can be reversed such that the groove 72 and seal 74 are located on the cover 40 instead of on the base portion of the junction box 14.

Figure 7:
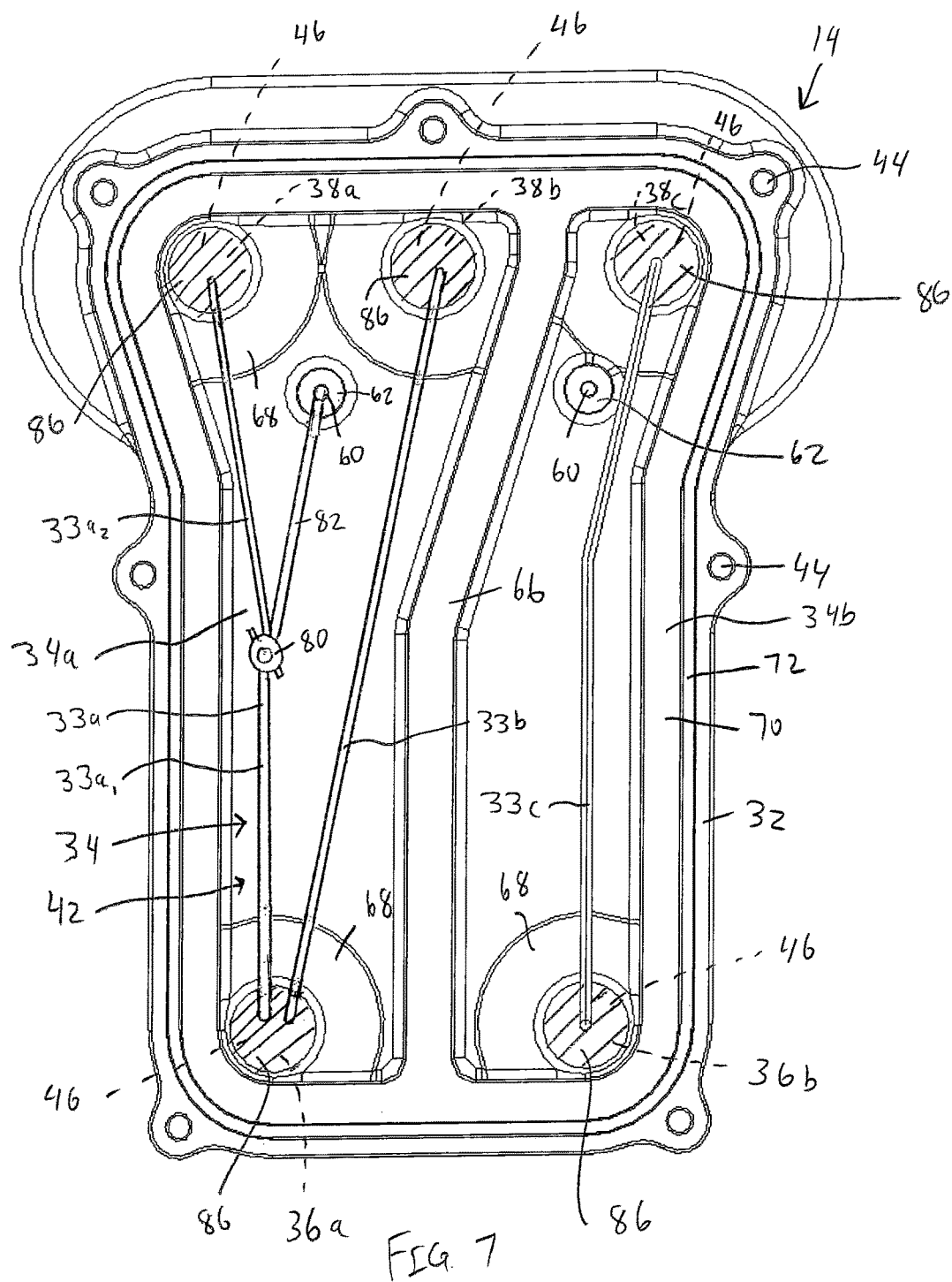
FIG. 7 is a top view of the junction box of FIG. 3, with various wires positioned therein.
Figure 8:
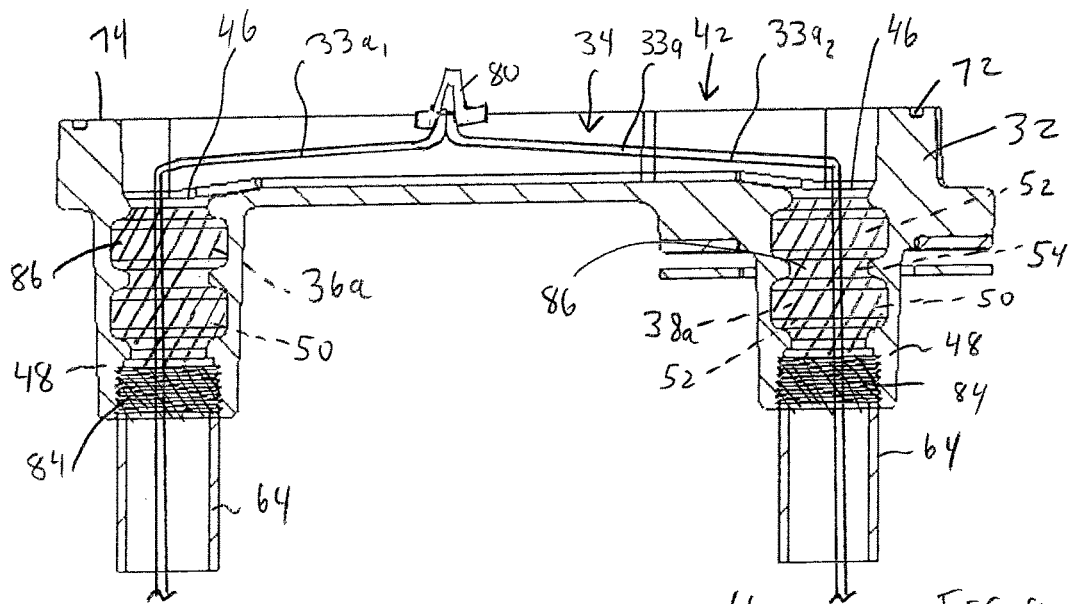
FIG. 8 shows the side cross section of FIG. 5, in conjunction with a wire, conduit and potting compound.

In order to use the sump system 10, with reference to FIGS. 7-9, conduit 64 can be coupled to each inlet 36/outlet 38, such as by threading the conduit 64 into the threaded area of each body 48. Next a wire 33, such as a wire 33a coming from a remote source (e.g. a remote processor, etc.) can be passed through one of the inlets 36 (inlet 36a in FIGS. 7-9) (with it being understood that what is termed an "inlet" and what is termed an "outlet" can be reversed, combined etc. as noted above) Another wire, such as wire $33a_2$ coming from the pump 31 or other component is passed through one of the outlets (outlet 38a in the illustrated embodiment) into the inner volume 34. A user can then reach through the access opening 42 and manually couple the wires $33a_1$, and $33a_2$ together to make an electrical connection therebetween such as by using a wire nut 80 or other wire coupling device. If desired as shown in FIG. 7, a ground wire 82 from one or both of the wires $33a_1$, $33a_2$ can extend to and be coupled to a ground connection 60.

Thus the access opening 42 can enable a user to manually complete a wire connection or connections such that the wire 33a, once connected, extends through the inlet 36a, the inner volume 34, and exits through the outlet 38a. In one embodiment, the access opening 42 has a size of at least about four inches by four inches, or at least about sixteen square inches, or in another case at least about five inches by five inches, or at least about twenty-five square inches, to provide sufficient space and access to the inner volume 34. Moreover, in some cases a wire connection is not required to be made, such as when a wire (e.g. wire 33b in FIGS. 7-9) extends continuously through the junction box 14. In this case the single continuous wire 33b can simply be manually passed through the inlet 36a and the outlet 38b without the need to make any connections. Thus, in the embodiment shown in FIGS. 7-9 the inlet 36a has two wires therein 33a, 33b, whereas each outlet 38a, 38b has only a single wire extending therethrough. The number of wires passing through each inlet 36 and outlet 38 can of course be varied as desired.

In the embodiment of FIGS. 7-9 a third wire (a continuous wire 33c, without connections in this illustrated case) is passed through the inlet 36b, extends through the inner volume 34 and exits through the outlet 38c. The wire 33c is positioned in the sub volume 34b, isolated from the sub volume 34a by the wall 66 as outlined above. Thus in some case the wire 33c can be configured to carry a relatively high voltage (e.g. a voltage that provides power to the pump 31 or other component) and is shielded from the wires 33a, 33b by the wall 66. The wires 33a, 33b can be configured to carry a relatively low voltage (e.g. a voltage that provides control signals, output or sensor signals (such as leak detection signals), etc.) and thus the wall 66 shields the wires 33a, 33b from the relatively high voltage wire 33c to avoid or minimize interference. In addition the use of the wall 66 can eliminate the need to provide separate shielding, such as shielding tubes or the like. However, if desired the wall 66 can be omitted and shielding tubes could be used as necessary or desired.

Once the wires 33 are passed through the inlets 36/outlets 38 and/or desired connections are made, a packing material 84 (e.g. wadded paper products, wadded fabric, or the like) can be inserted into the inner volume 50 of the inlets 36 and/or outlets 38 and/or conduit 64, such as a lower/threaded portion of each inlet 36/outlet 38, as shown in FIGS. 8 and 9. Next a filler material 86, such as a potting compound, epoxy or the like in a liquid form, can be introduced into each inlet 36/outlet 38 above the packing material 84 and flows downwardly, by the force of gravity, filling or generally filling the inner volume 50 and/or an entire cross sectional area of part of each of the inlets 36 and/or outlets 38, as shown in FIGS. 7-9. The angled surfaces 68 described above help to route the liquid filler material 86 into the inner volume 50 of each inlet 36/outlet 38. Each inlet 36/outlet 38, even those that do not have any wires 33 extending therethrough, may be filled in this manner. Alternatively, only the outlets 38 can be filled with the filler material 86 if desired, as it may be more important to seal the junction box 14 relative to the sump 12 as compared to upstream components.

The cover 40 can then be replaced and the filler material 86 is allowed to harden, solidify and cure. Once the filler material 86 is cured the filler material 86 secures the wires 33 in place and seals the junction box/inner volume in a fluid-tight and explosion-containing manner. In addition, the "dumbbell" shape of the openings 50/filler material 86, as shown in FIGS. 8 and 9, helps to lock the cured filler material 86 in place and resists movement in either axial (upward or downward) direction due to the narrow neck portion 52, such as in the case of an explosion or other exposure to pressure forces.

As noted above, each inlet 36/outlet 38 and conduit 64 can be generally vertically oriented, which provides ease of connection, helps to minimize the inner volume 34 of the junction box 14, and enables the filler material 86 to naturally flow into the inlets 36 and outlets 38 as desired. In addition, as outlined above, the junction box 14 can be positioned in an upper half of the sump 12/sump system 10. This helps to elevate the junction box 14, wires 33 and associated connections 80 at a relatively high position, further away from the water table, or fluids or contaminants that can be inside the sump 12.

As noted above, the junction box 14 can in one case be integrally attached to the sump 12, such that the sump 12 and junction box 14 are sold and installed as a single unit. This configuration enables the junction box 14, inlets 36 and outlets 38, conduits 64, etc. to be formed or connected in a secure and fluid tight manner at the factory, saving labor in the field. However, if desired the junction box 14 can be made and/or sold separately from the sump 12 and later attached.

FIGS. 10-21 illustrate another embodiment of the system described above which operates on similar principles. The inlets 36 and outlets 38 in this embodiment can be generally arranged in pairs, such as inlet $36_1$ and outlet $38_1$ pair and inlet $36_2$ and outlet $38_2$ pair (FIG. 14), which are positioned on opposite sides of the body 32 and generally axially aligned. The junction box 14' can include as many inlet 36 and outlet 38 pairs as desired, and in one case can have a number of inlet 36 and outlet 38 pairs corresponding to the number of wires 33 of the pump 31 and/or number of conduits 64 desired. However, in the same manner as outlined above in the embodiment of FIGS. 1-9, the number of inlets 36 and outlets 38 may not necessarily be the same, and may not necessarily be arranged in pairs.

In the embodiment of FIGS. 10-21, the junction box 14' includes four inlet 36 and outlet 38 pairs (see FIG. 11), for a total of eight openings, which can correspond to a pump or other connection system 31 having four wires 33, although as illustrated in the embodiment above, more than one wire 33 can pass through an inlet 36 and/or outlet 38. The embodiment of FIGS. 10-21 shows each inlet 36 and outlet 38 as being oriented generally horizontally when installed and in use, and each inlet 36 being axially aligned with a corresponding outlet 38. However it should be understood that each inlet 36 and outlet 38 can be positioned at a variety of angles or orientations besides horizontal, and each inlet 36 may not necessarily be aligned with a corresponding outlet 38, and the inlet 36 and outlet 38 may not necessarily be positioned on opposite sides of the junction box 14'.

Figure 14:
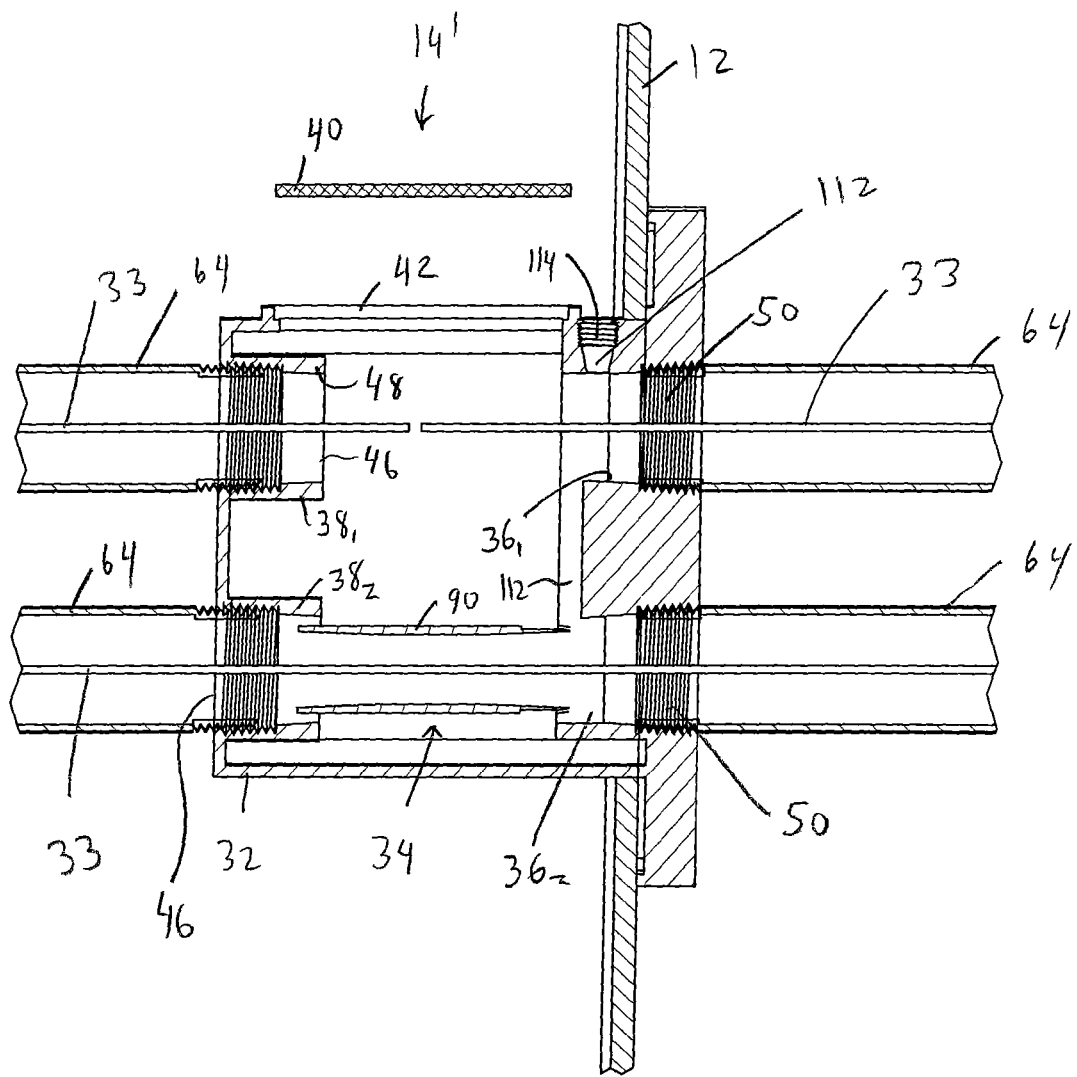
FIG. 14 is a detail cross section of part of the sump and the junction box of FIG. 10, with the cover exploded away and wires/wire segments extending therethrough.

In order to use the junction box 14', as shown in FIG. 14, a conduit, pipe or the like 64 can be coupled to each of the inlets 36 and outlets 38 as shown. A wire 33 can then be passed through each inner (sump-side) conduit 64 and outlet 38 (outlets $38_1$, $38_2$ in FIG. 14), and in this case the wire 33 may extend from or be coupled to the pump 31. The wires 33 (for example, wire 33 passing through outlet $38_1$) can extend through the inner volume of the sump-side outlet 38, and terminate in the inner volume 34 of the junction box 14'. A connecting wire 33, which can be electrically connected to a controller, processor, sensor, power source or the like, extends through a corresponding sump-distant inlet 36 (e.g. inlet $36_1$, in FIG. 14) and an associated conduit 64, and also terminates in the inner volume 34 of the junction box 14'.

Figure 19:
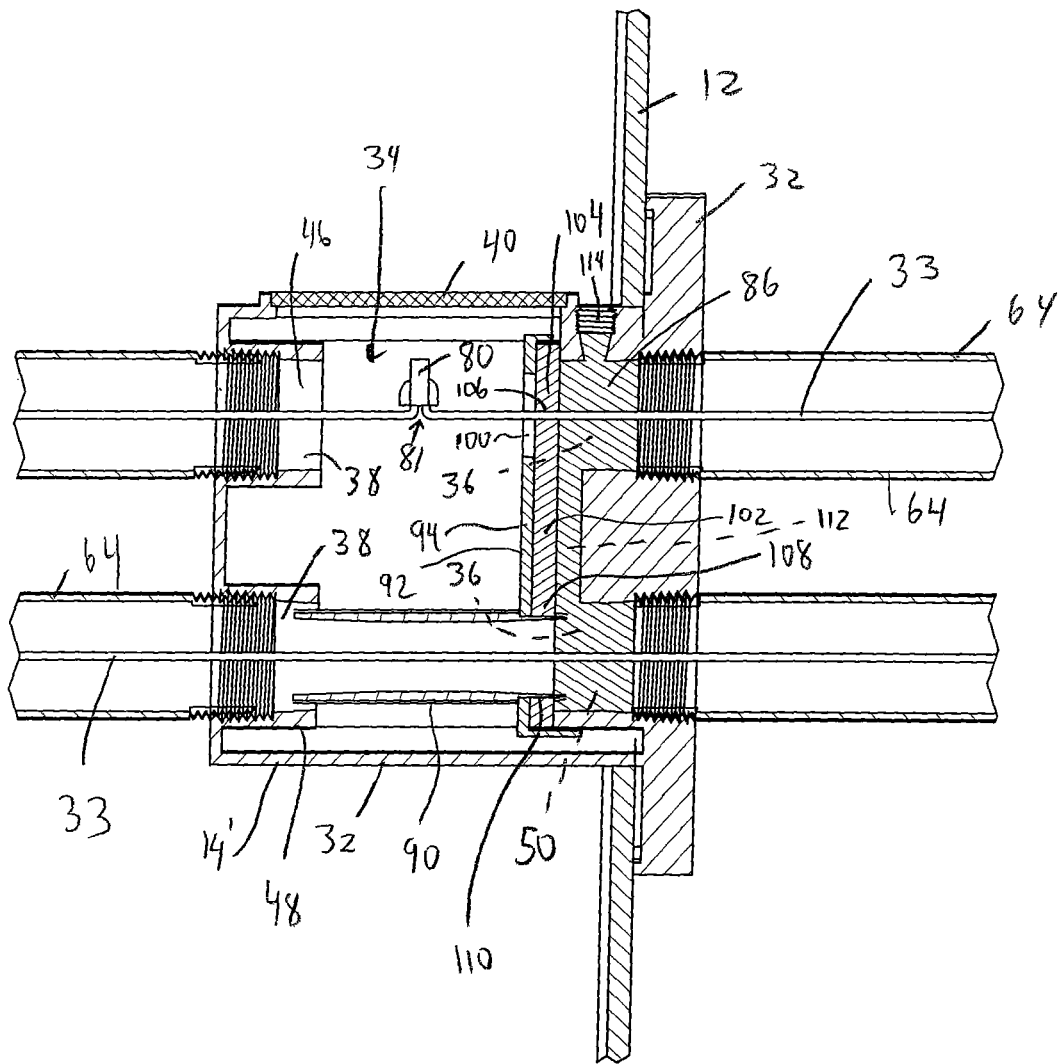
FIG. 19 illustrates the system of FIGS. 14 and 18 with the wire segments connected, the cover mounted in place and a potting compound filling part of the junction box.
Figure 20:
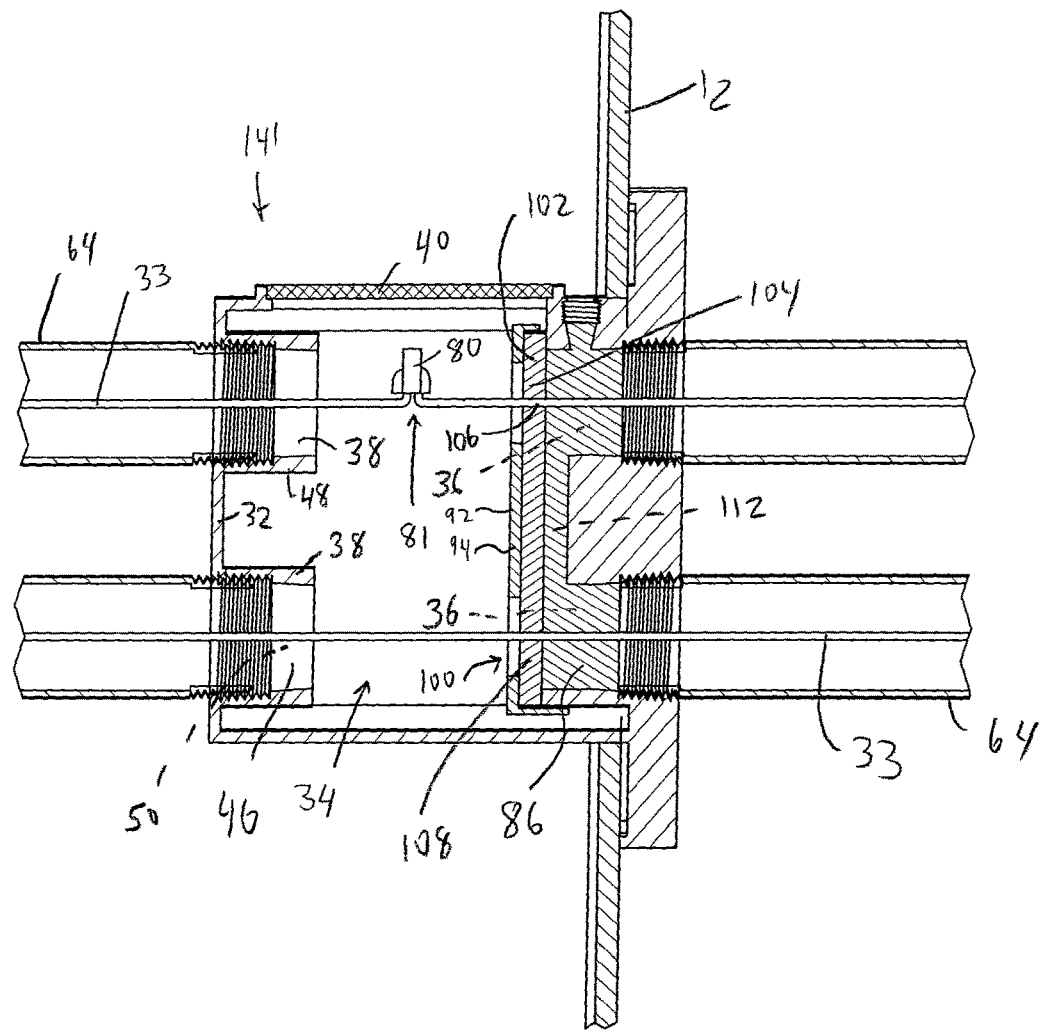
FIG. 20 illustrates another alternative system.

In order to electrically couple the wires or wire segments 33 in the upper portion of the embodiment of FIG. 14, a user can reach through the access opening 42 to guide the wires 33 through the corresponding outlet(s) 38 and inlets(s) 36 and manually attach or couple the wires 33, such as by a wire nut 80 as shown in FIG. 19 to form a wire connection 81. Accordingly, the access opening 42 can be sized and positioned to allow a user to fit his or her hand therethrough to complete the manual electrical connection of the wires 33 in the inner volume 34 of the junction box 14'.

In some cases, a single one-piece wire 33 can extend directly through the inner volume 34 of the junction box 14' and not require any connections, such as wire 33 extending through the outlet $38_2$ and inlet $36_2$ of FIG. 14. In this case no electrical connections for such wire 33 need to be completed in the junction box 14'. This arrangement may be utilized for example when the wire 33 is a power-supplying wire in which case connections or splices are desired to be avoided. In addition, in some cases (such as when the wire 33 is power-supplying wire having a relatively high voltage) a shielding tube 90 may be positioned in the inner volume 34 surrounding the associated wire 33 to provide shielding and prevent a high voltage wire 33 from interfering with signals carried by other (low-voltage) wires 33 positioned in the inner volume 34. Alternatively, rather than using the shielding tube, the junction box 14' can incorporate a shielding structure such as the wall 66 outlined above.

FIG. 19 illustrates the case where the upper wire 33 is connected or spliced in the inner volume 34 of the junction box 14', and the lower wire 33 extends continuously through the inner volume 34 of the junction box 14'. However, this positioning can be reversed such that the upper wire 33 extends continuously and the lower wire 33 is coupled or spliced. In addition, if desired both wires 33 can be spliced, or both wires 33 can be continuous. These various combinations are also possible in the embodiment of FIGS. 1-9. Moreover, one, both or neither of the wires 33 can be positioned within a shielding tube 90. In addition, numerous variations beyond that shown in the drawings are possible.

Figure 15:
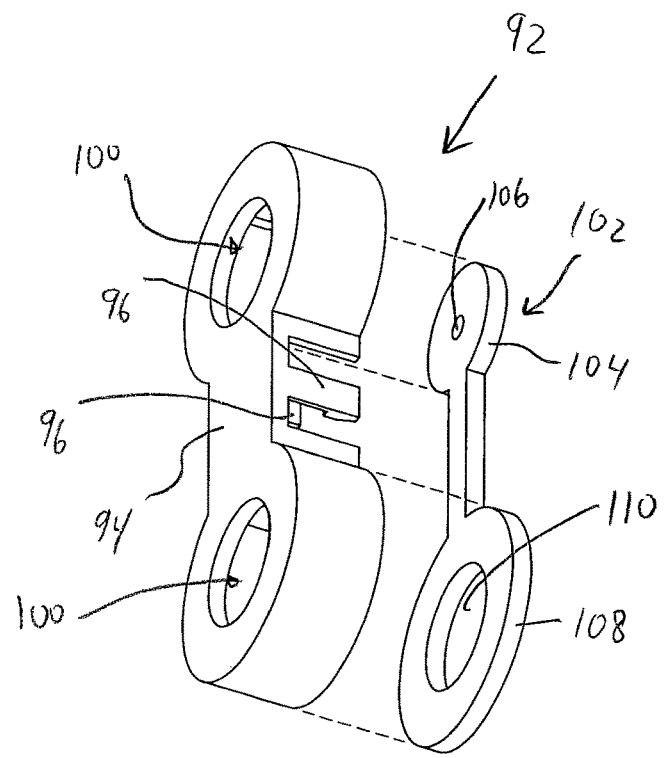
FIG. 15 is a perspective view of a retaining component and an associated sealing component.
Figures 16, 17:
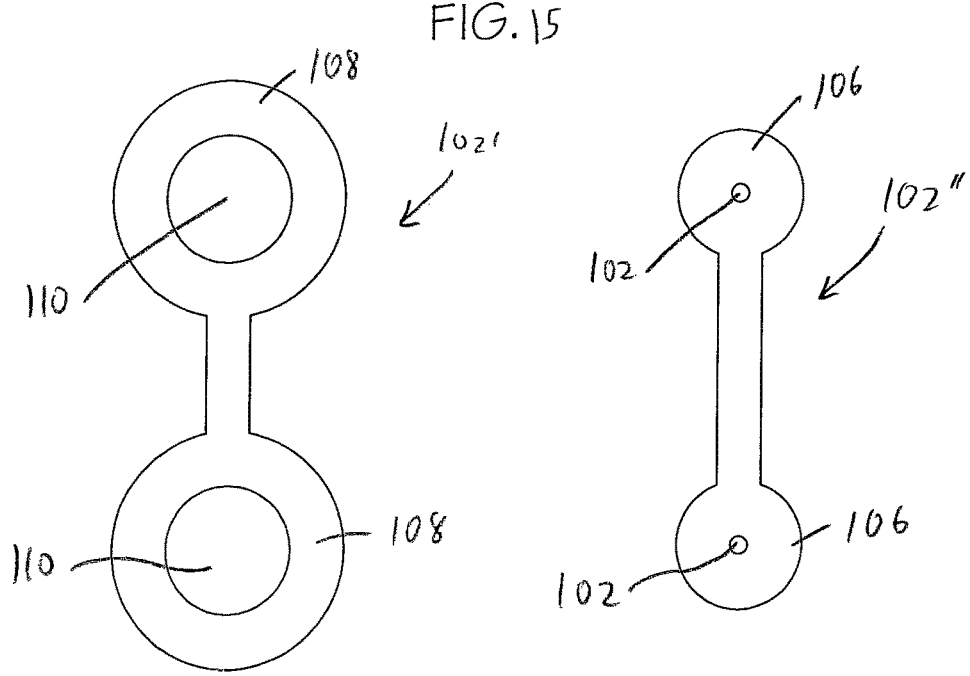
FIG. 16 is a front view of an alternative sealing component that can be used with the retaining component of FIG. 15.
FIG. 17 is a front view of another alternative sealing component that can be used with the retaining component of FIG. 15.

In any case, once the wires 33 are connected (if needed) and/or once any shielding tubes 90 (if utilized) are inserted in place, one or more retaining components 92 can be connected to the body 32 and/or inlet 36 and/or outlet 38. As shown in FIG. 15, the retaining component 92 can include a frame 94 configured to be securely coupled to one or more of the inlets 36 and/or outlets 38 and/or the body 32. In particular the frame 94 can include various barbed flanges 96 and/or clips at various positions which are configured to be secured to a lip 98 or other associated components of the junction box 14'. The retaining component 92/frame 94 can be configured to be secured to the junction box 14' by various other arrangements, such as other clips, cooperating protrusions/recesses, interengaging geometries, via magnets, etc. The retaining component 92/frame 94 can include a set of openings 100, each opening being positioned to be aligned with an inlet 36 or outlet 38 when the retaining component 92 is mounted in place.

The retaining component 92 also includes or is configured to receive a sealing component 102. The sealing component 102 shown in FIG. 15 is configured to correspond to the two associated (vertically aligned, in one case) inlets 36 or outlets 38 on one side of the junction box 14' (e.g. inlets $36_1$ and $36_2$ or outlets $38_1$ and $38_2$ of FIG. 14). The sealing component 102 of FIG. 15 includes a wire sealing portion 104 which includes a relatively small hole 106 sized and/or configured to sealingly receive a wire 33 therethrough (such as a wire 33 having a diameter of about ¼ inch in one case, or less than about ¾ inch in one case), and a tube sealing portion 108 which includes a relatively large hole 110 sized and/or configured to sealingly receive the shielding tube 90 therethrough.

Figure 18:
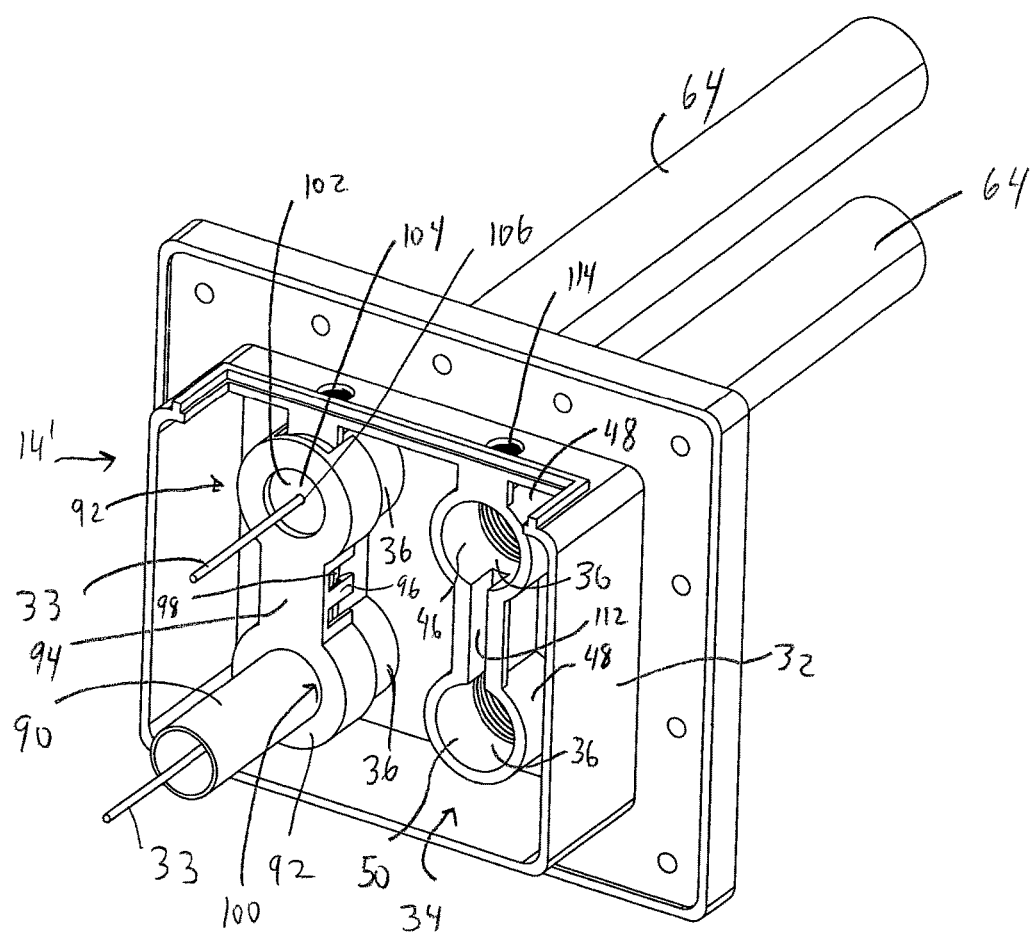
FIG. 18 is a front perspective view of the system of FIG. 14, with the retaining component and sealing component of FIG. 15 attached thereto.

In this manner, as shown in FIGS. 18 and 19, when the retaining component 92 and sealing component 102 of FIG. 15 are used in conjunction with the system of FIG. 14, both the upper wire 33 and the shielding tube 90 sealingly engage the sealing component 102, and in addition the wire 33 and shielding tube 90 extend through corresponding openings 100 of the retaining component 92. When the retaining component 92 and sealing component 102 are secured in place, the sealing component 102 generally fluidly isolates the inner volume 50 of the inlet(s) 36 (or outlets 38) from the inner volume 34 of the junction box 14, or at least fluidly isolates them sufficiently to generally retain a sufficiently viscous fluid in the inner volume of the inlet 36 (or outlets 38) as will be described in greater detail below.

When the retaining component 92 and sealing component 102 are fully assembled and snapped in place on the junction box 14', the sealing component 102 is positioned in and/or adjacent to the associated inlet(s) 36, generally covering/sealing the associated inlet(s) 36. FIG. 15 illustrates a sealing component 102 with a wire sealing portion 104 and a tube sealing portion 108 to correspond to the arrangement of the junction box 14' of FIG. 14. However, if the sealing component 102 is used with inlets 36 (or outlets 38) that both utilize shielding tubes 90, then the sealing component 102' of FIG. 16, which has two tube sealing portions 108, can be utilized. Conversely, if the sealing component 102 is used with inlets 36 (or outlets 38) which both do not utilize shielding tubes 90 and instead utilize bare wire 33, then the sealing component 102" of FIG. 17, which has two wire sealing portions 106, can be utilized.

In addition, FIG. 15 illustrates a single retaining component 92 used with two sealing portions 104, 108 such that the retaining component 92/sealing component 102 can cover two inlets 36 or outlets 38 when snapped in place. However, it should be understood that the retaining component 92 can be arranged in various other configurations; for example, a single retaining component 92 can be configured to be used with four (or other number as desired) sealing portions 104, 108 such that all inlets 36 or outlets 38 on one side of the junction box 14' are sealed by a single retaining component 92. Conversely, if desired a single retaining component 92 can be used in conjunction with only a single sealing portion 104, 108 to cover a single inlet 36 or outlet 38. In addition, a single retaining component 92 can be used with multiple sealing components 102; e.g. the sealing component 102 of FIG. 15 can be divided into two discrete parts, or a sealing component 102 can include four (or other number as desired) sealing portions 104, 108.

When the wires 33 need to be connected at a connection 80, the retaining component 92 and sealing component 102 may be positioned in the inner volume 34 of the junction box 14', with the wires 33 passed through the associated openings 100, 106, 110, before the electrical connection 80 is made, for easier installation. In some cases, however, each sealing portion 104, 108 and/or the retaining component 92 can include a cut, slit, opening or the like that extends from an outer periphery of the sealing portion 104, 108 and/or retaining component 92 to the inner opening 100, 106, 110 such that a wire 33/shielding tube 90 can be inserted into the associated opening 100, 106, 110 in a lateral direction. FIG. 18 illustrates only two wires 33 extending into the junction box 14'; if desired two other wires 33 can also be passed through the junction box 14' and another retaining component 92 with a sealing component 102 can be snapped in place. In any case, once the desired connections 80 are made and/or shielding tubes 90 inserted, user then secures the cover 40 in place over the access opening 42 in a fluid-tight manner.

Figure 11:
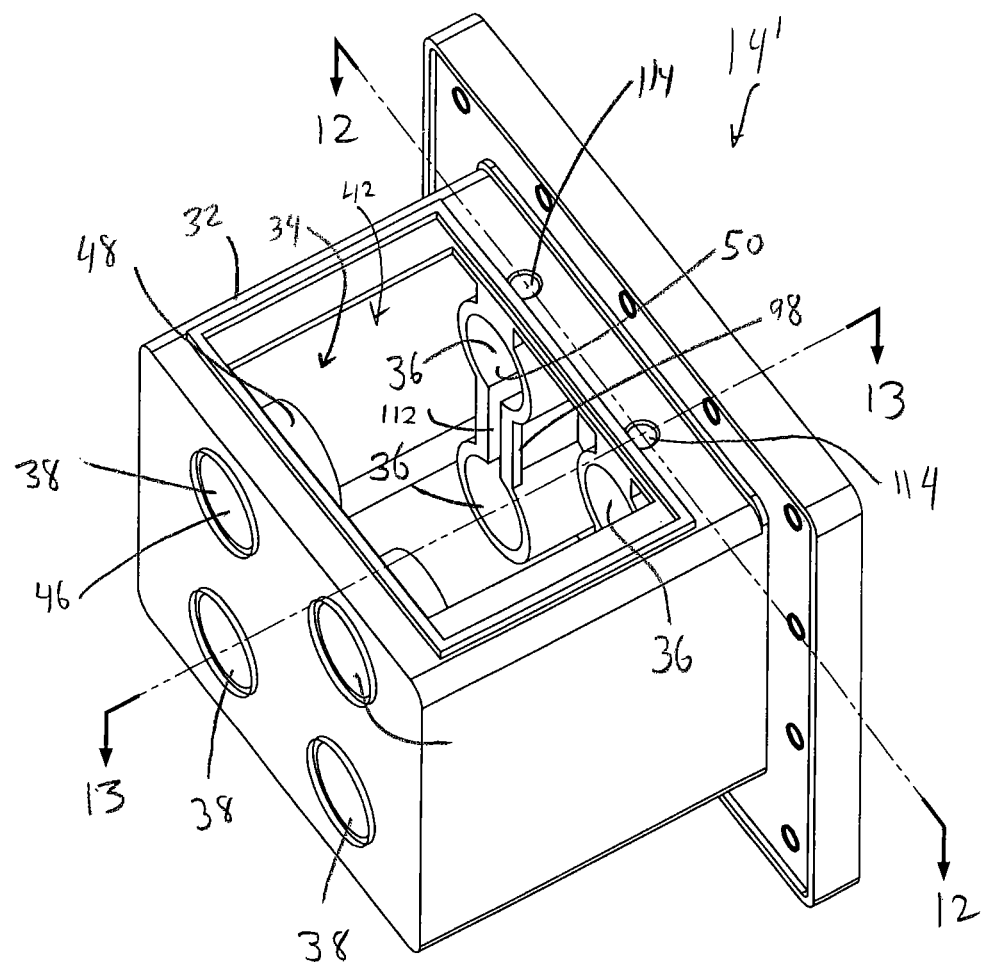
FIG. 11 is an upper perspective view of the junction box of the sump of FIG. 10.
Figure 12:
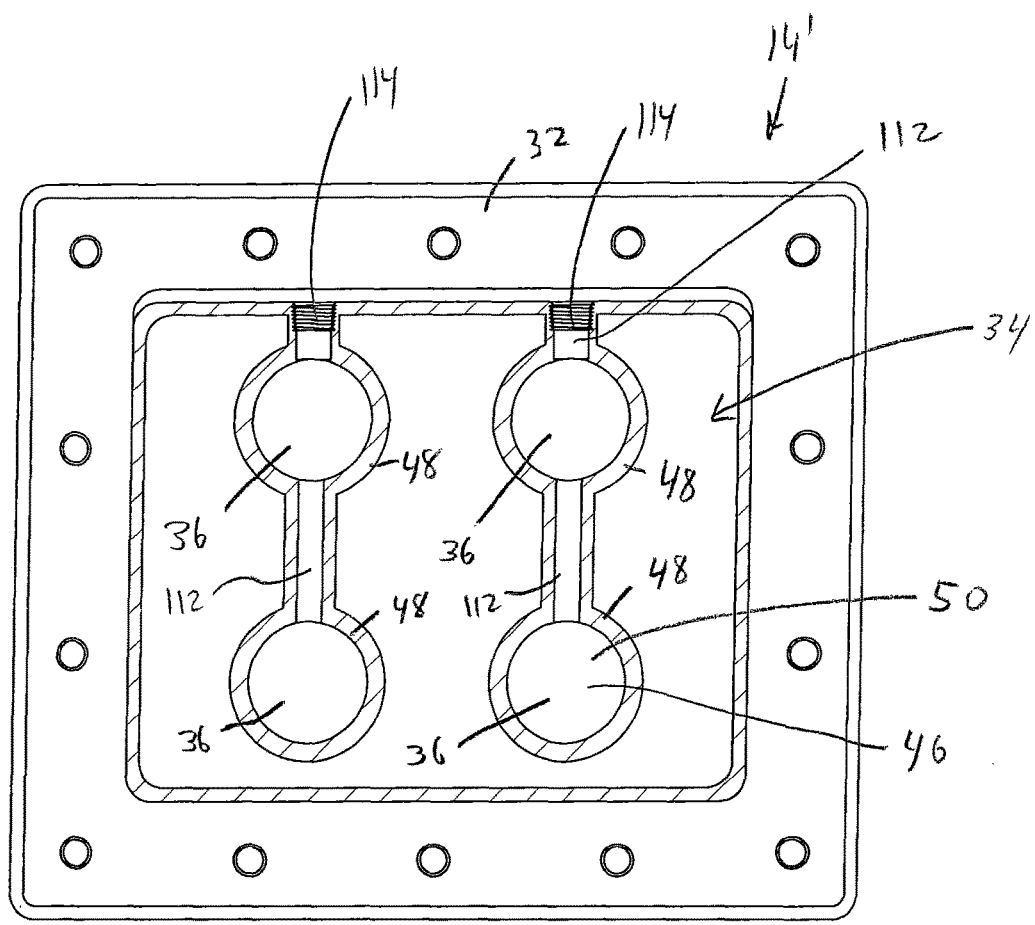
FIG. 12 is a cross section taken along line 12-12 of FIG. 11.
Figure 13:
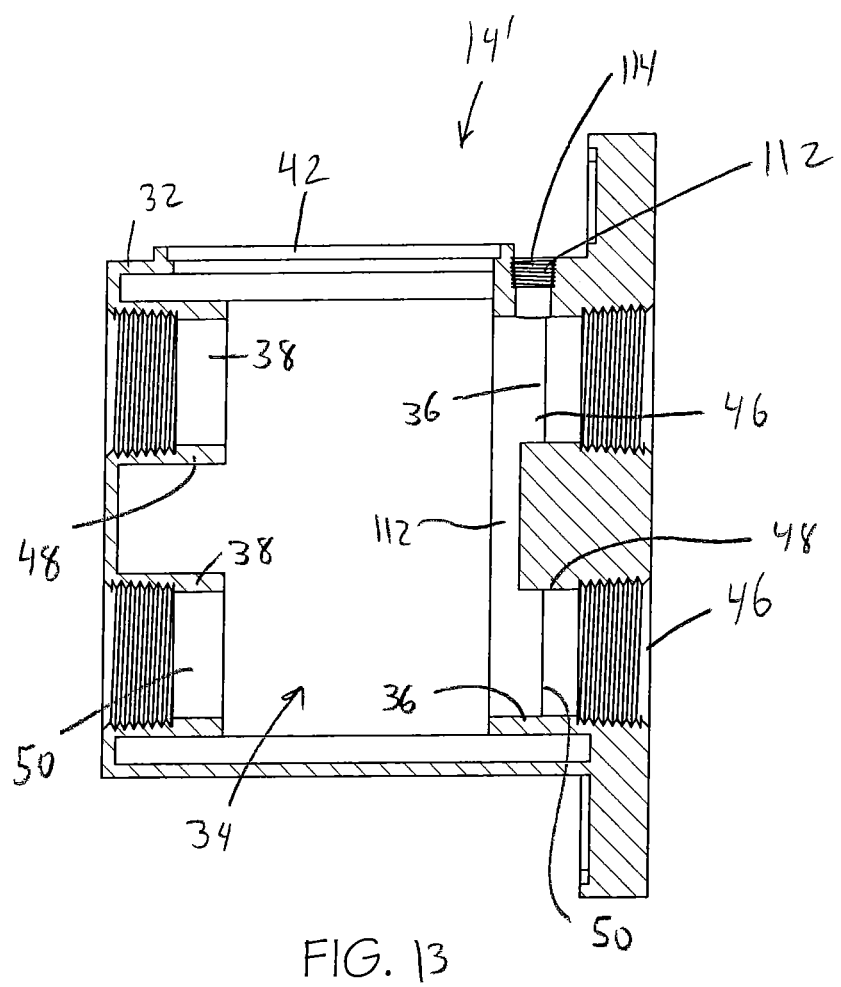
FIG. 13 is a cross section taken along lines 13-13 of FIG. 11.

With reference to FIGS. 11-13, the body 32 of the junction box 14' can include one or more channels 112 in fluid communication with one or more inlet(s) 36 at one end, and an outer (upper) surface of the body 32 at a channel opening 114. For example, FIGS. 11 and 12 illustrate two channels 112, each of which are fluidly coupled to two (vertically) aligned inlets 36 (e.g., one channel 112 is in fluid communication with the inlets $36_1$ and $36_2$ of FIG. 14). In this manner, after the wires 33 are passed through the junction box 14', the connection(s) 80 (if any) are made, and the cover 40 (if utilized) secured in place, a filler material 86, such as a potting compound, epoxy or the like in a liquid form, can be introduced into the channel(s) 112 via the associated channel opening 114 and flows downwardly, by the force of gravity, filling or generally filling the channel 112 and/or an inner volume 50 and/or an entire cross sectional area of part of each of the inlets 36, as shown in FIG. 19. The sealing component 92 generally stops the flow of the filler material 86 into the inner volume 34 of the body 32, and in the illustrated embodiment defines and/or forms a portion of the channel 112 to close the channel 112. In an alternative embodiment the channel(s) 112 (at portions spaced away from the inlets 36) can be internally positioned and generally closed/sealed, and does not require the sealing component 102 to close those portions of the channel 112.

It may be desired to arrest the travel of the filler material 86 in the conduits 64 and/or in shielding tubes 90 in locations where the sealing components 102 are not located. In these cases the user can insert a packing material where desired to prevent the filler material 86 from flowing into the conduit 64 and/or shielding tube 90. For example, in the embodiment of FIG. 19, a user may insert a packing material (not shown) at the terminal end of both the conduit 64 adjacent to the inlets 36 and/or the shielding tube 90, to block or limit the flow of filler material 86. The packing material can be left in place or removed after the filler material 86 has cured sufficiently. Thus, the retaining component(s) 92/sealing component(s) 102, in combination with the channels 112, enables each of the inlets 36 to be effectively filled with the filler material 86, encapsulating each wire 33 and at least partially filling one or more of the inlets 36 in a single action and fluidly isolating the inner volume 34 of the junction box 14'. In this manner the entire inner volume 34 of the junction box 14' does not have to be filled with the filler material 86, saving materials, time and labor. The same or similar benefits are provided by the embodiment shown in FIGS. 1-9.

It is noted that FIGS. 18-21 illustrate the channel(s) 112 adjacent to the inlets 36 being filled with the filler material 86; however, if desired, channel system(s) adjacent to the outlets 38 can be provided and the outlets 38 can instead or in addition be filled. In addition, FIGS. 11 and 12 illustrate a pair of channels 112/channel inlets 114, each of which is associated with two inlets 36. However, it should be understood that the channel(s) 112 can be arranged in various configurations. For example, a single channel 112/channel inlet 114 can be in fluid communication with four (or three, or more than four) inlets 36 or outlets 38 to allow the inlets 36 or outlets 38 to be simultaneously filled. Conversely, if desired a channel 112/channel inlet 114 can be fluidly associated with only a single inlet 36 or outlet 38.

In any case, once the filler material 86 is introduced and is allowed to harden, solidify and cure, the junction box 14, 14' is fluid tight, and the wires 33 are immersed in the cured filler material 86, further fluidly isolating the electrical connections 80, and if desired fluidly isolating the inner volume 32 of the junction box 14, 14' from the inner volume 16 of the sump 12 to provide additional safety, limit the propagation of explosions and to help meet required regulations.

Having described the invention in detail and by reference to certain embodiments, it will be apparent that modifications and variations thereof are possible without departing from the scope of the invention.

What is claimed is:

1. A system comprising:
a sump having an inner volume; and
a junction box coupled to said sump and including:
a body defining an inner volume;
a first inlet and a second inlet, wherein each inlet is in fluid communication with said inner volume of said body; and
a first outlet and a second outlet, wherein each outlet is in fluid communication with said inner volume of said body such that a first wire is positionable in said first inlet and said first outlet and a second wire is positionable in said second inlet and said second outlet, wherein each outlet is in fluid communication with said inner volume of said sump, and wherein each inlet is not in direct fluid communication with said inner volume of said sump.

2. The system of claim 1 wherein each outlet includes a conduit coupled thereto and positioned in said inner volume of said sump, and wherein each inlet includes a conduit coupled thereto and positioned externally of said inner volume of said sump.

3. The system of claim 1 wherein said junction box is integrally and non-removably coupled to said sump.

4. The system of claim 1 wherein said junction box further includes a third outlet in fluid communication with said inner volume and configured such that a third wire is positionable in said first inlet and said third outlet.

5. The system of claim 1 wherein said body includes a wall positioned in said inner volume and configured to isolate said first inlet and said first outlet from said second inlet and said second outlet.

6. The system of claim 1 wherein said inner volume of said junction box is fluidly isolated from said inner volume of said sump except for any fluid connections via said first and second outlets.

7. The system of claim 1 wherein each inlet and each outlet include an opening in said body.

8. The system of claim 7 wherein said sump includes a central axis configured to be oriented generally vertically when installed into or under a ground surface, and wherein each opening has a central axis oriented generally parallel to said central axis.

9. The system of claim 7 wherein each opening is located in a lower surface of said junction box.

10. The system of claim 1 further comprising a first inlet conduit coupled to said first inlet, a first outlet conduit coupled to said first outlet, a second inlet conduit coupled to said second inlet, and a second outlet conduit coupled to said second outlet.

11. The system of claim 1 wherein each outlet defines an outlet volume configured to receive a filler material therein.

12. The system of claim 1 wherein said sump includes a vertical height dimension, and wherein said junction box is positioned in an upper half of said height dimension of said sump.

13. The system of claim 1 wherein each inlet and each outlet include an opening in said body, and wherein said body includes an angled surface positioned adjacent to each opening to guide any fluids positioned adjacent to each opening toward the associated opening.

14. The system of claim 1 wherein said junction box includes a cover that is removable to provide manual access to said inner volume of said junction box.

15. The system of claim 1 wherein said sump is installed in a ground surface, wherein the system includes the first wire extending through said first inlet and said first outlet and into the inner volume of the sump, and wherein the system further includes the second wire extending through said second inlet and said second outlet and into the volume of the sump, and wherein the first outlet and the second outlet are each at least partially filled with a filler material.

16. The system of claim 15 further comprising a first inlet conduit coupled to said first inlet and receiving said first wire therein, a first outlet conduit coupled to said first outlet and receiving said first wire therein, a second inlet conduit coupled to said second inlet and receiving said second wire therein, and a second outlet conduit coupled to said second outlet and receiving said second wire therein, and wherein said first inlet conduit, said first outlet conduit, said second inlet conduit, and said second outlet conduit are all generally vertically oriented.

17. The system of claim 1 wherein said inner volume of said sump is at least about ten times greater than said inner volume of said body.

18. A system comprising:
a sump having an inner volume; and
a junction box coupled to said sump and including:
a body defining an inner volume;
a first inlet and a second inlet, wherein each inlet is in fluid communication with said inner volume of said body; and
a first outlet and a second outlet, wherein each outlet is in fluid communication with said inner volume of said body such that a first wire is positionable in said first inlet and said first outlet and a second wire is positionable in said second inlet and said second outlet, wherein said inner volume of said junction box is generally fluidly isolated from said inner volume of said sump.

19. A system comprising:
a sump having an inner volume; and
a junction box integrally and non-removably coupled to said sump and including:
a body defining an inner volume;
an inlet in fluid communication with said inner volume of said body; and
an outlet in fluid communication with said inner volume of said body such that a wire is positionable in said inlet, said outlet and said inner volume of said sump, wherein said sump includes an axis configured to be oriented generally vertically when installed into or under a ground surface, and wherein said inlet and said outlet each have an opening with an axis oriented generally parallel to said axis of said sump.

20. The system of claim 19 further comprising a supplemental inlet in fluid communication with said inner volume of said body and a supplemental outlet in fluid communication with said inner volume of said body and configured such that a supplemental wire is positionable in supplemental inlet and said supplemental outlet.

21. A junction box system comprising:
a body defining an inner volume;
a first inlet and a second inlet, wherein each inlet is in fluid communication with said inner volume; and
a first outlet and a second outlet, wherein each outlet is in fluid communication with said inner volume of said body such that a first wire is positionable in said first inlet and said first outlet and a second wire is positionable in said second inlet and said second outlet, wherein each outlet defines an outlet volume configured to receive a filler material therein, wherein said first inlet and said first outlet are in fluid communication with each other and said second inlet and said second outlet are in fluid communication with each other, and wherein said first inlet and said first outlet are configured to be fluidly isolated from said second inlet and said second outlet.

22. The junction box system of claim 21 further comprising a sump having an inner volume, and wherein said junction box is coupled to said sump such that each outlet is in fluid communication with said inner volume of said sump.

23. The junction box system of claim 21 wherein said junction box further includes a third outlet in fluid communication with said inner volume and configured such that a third wire is positionable in said first inlet and said third outlet.

24. The junction box system of claim 21 wherein said body includes a wall or wall portion positioned in said inner volume and entirely fluidly isolating said first inlet and said first outlet from said second inlet and said second outlet.

25. The junction box system of claim 21 wherein said first inlet and said first outlet are configured to be fluidly isolated from said second inlet and said second outlet in said inner volume.

* * * * *